Patented Jan. 30, 1951

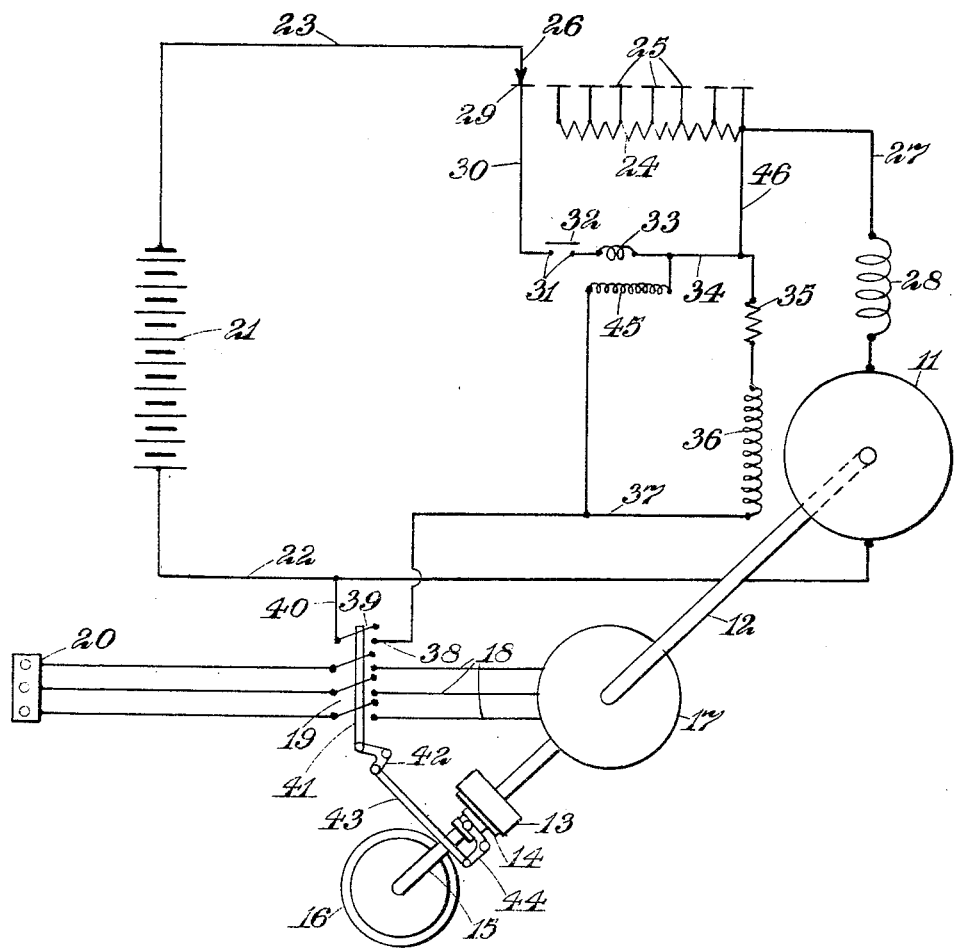

2,539,987

UNITED STATES PATENT OFFICE

2,539,987

ELECTRICALLY OPERATED TRUCK AND BATTERY CHARGING CONTROL THEREFOR

Frank Edward Burger, Warren Row, near Reading, England, assignor to Lansing-Bagnall Limited, Isleworth, Middlesex, England, a British company Application January 17, 1947, Serial No. 722,517
In Great Britain September 19, 1946

Section 1, Public Law 690, August 8, 1946
Patent expires September 19, 1966

4 Claims. (Cl. 180—65)

This invention comprises improvements in or relating to electrically-operated trucks. Under the term "trucks" are included all wheeled vehicles, especially those intended for use in warehouses and the like for stacking or transporting goods from place to place and portable cranes for lifting purposes. The invention relates to battery-operated motor-driven trucks. A limitation upon the use of such trucks arises from the necessity of charging the batteries frequently. When a large number of trucks are to be employed it becomes possible to install special charging plant but if only one or two trucks are needed in a small warehouse the charging plant constitutes an undue overhead expense, which it is an object of this invention to avoid.

According to the present invention, a truck is provided with a battery, a traction motor which is capable of acting also, if suitably driven, as a dynamo for charging the battery, and a mains motor capable of being operated from electric supply mains, in combination with means for rendering the drive of the truck wheels ineffective and for operating the traction motor by the mains motor when desired.

The following is a description by way of example of one form of truck in accordance with the invention, reference being made to the accompanying diagrammatic drawing which shows the electrical connections of the various parts:

A truck is provided according to the invention which is of any desired or suitable mechanical construction having a chassis and supporting wheels, means for supporting an electric battery, an electric traction motor and a controller. The rotating portion of the electric traction motor is indicated in the drawing at 11 and operates a shaft 12 which is connected through a clutch comprising two parts 13, 14, to a second shaft 15 which operates one or more of the supporting wheels, indicated in the diagram at 16. It will be understood that the wheels 16 can be connected to the shaft 15 through a reduction gear if desired. A second (mains) motor 17 is mounted in line with the motor 11 upon the shaft 12. This is shown as a three-phase motor and is connected by lines 18 through a switch 19 to a plug 20 on the truck. The plug 20 can be connected by a flexible lead to any desired mains supply when it is desired to operate the motor 11 as a dynamo.

For driving the truck the motor 11 is operated by a battery 21 one pole of which is connected to the motor directly by a line 22 and the other pole of which is connected by a line 23 to a rheostat 24 provided with a series of contacts 25 and a movable control member 26 capable of moving over the contacts 25 and varying the amount of the resistance 24 which is in circuit. From the rheostat 24 a line 27 leads to a series field winding 28 of the motor 11 and thence to the other terminal of the armature thereof. By these connections the motor can be operated from the battery and the truck driven.

The rheostat 24 is provided with an "off" contact 29 and this is connected by a line 30 to the contacts 31 of a battery-charging cut-out, which contacts can be connected by a contact member 32 to a series coil 33 of the cut-out and thence by line 34 and resistance 35 to a shunt field winding 36 of the motor 11. The other terminal of the shunt field winding is connected by a line 37 to a contact 38 capable of being closed by an additional switch arm 39 of the switch 19, and connected when so closed by a line 40 to the line 22, and so to the terminal of the motor 11.

In operation, if it is desired to charge the battery the truck is driven up to a position where the plug 20 can be connected by a flexible lead to a mains supply and is plugged into the mains. The movable member 26 of the control rheostat 24 is moved to the "off" contact 29 and the switch 19 is closed. Closing of the switch 19 automatically disconnects the clutch 13, 14, so that operation of the shaft 12 by the motor 17 will not drive the truck. This automatic disconnection of the clutch is effected by interlocking means which are shown diagrammatically in the drawing as comprising a rod 41 on the switch 19 connected by a bell-crank lever 42 to a link 43, the link 43 being connected by a further bell-crank lever 44 to the movable member 14 of the clutch. Any suitable interlocking means between the switch and the clutch may, however, be adopted. As soon as the switch 19 is closed the motor 11 is driven by the motor 17. At the same time the shunt winding 36 is placed in circuit by closing of the contacts 38, 39 on the switch 19. The cut-out contacts 32, 31 are closed by the resulting energisation of a shunt coil 45 of the cut-out which is connected between the lines 34 and 37. The moving of member 26 to the contact 29 will connect lead 30 and one of the battery-charging cut-out terminals 31 to battery lead 23, the battery-charging cut-out switch 32 being normally open. The closing of terminals 38 and 39 of switch 19 will connect shunt winding lead 37 to lead 40 and battery lead 22, and will connect the leads 18 of mains motor 17 to the supply connection 20. Assuming a source of power at supply connection 20, mains motor 17 will then begin to rotate, driving traction motor 11 by means of shaft 12. A voltage will thus be produced by said traction motor 11 operating as a dynamo and will appear across the opposite armature terminals thereof. A current will be caused to flow by said voltage through the shunt winding 36 by the following path: from one terminal of the traction motor armature through series winding 28, lead 27, lead 46, resistor 35, shunt winding 36, lead 37, terminals 38 and 39 of switch 19, lead 40 and lead 22 back to the opposite terminal of the traction motor armature. Thus, the traction motor 11, acting essentially as a self-excited shunt wound dynamo will build up to a voltage sufficient for charging storage battery 21. When such voltage is reached, the current flow through cut-out coil 45 in parallel with shunt winding 36 and shunt winding resistor 35 will close battery cut-out switch 32, thus applying the voltage produced by the traction motor 11 to battery lead 23 to charge the storage battery. Consequently the motor 11 operates as a dynamo and charges the battery 21, the charging current proceeding from the line 27 through the cut-out coil 33 by way of a connection 46, the rheostat resistance 24 being out of the circuit so that no resistance to charging is offered. The amount of the resistance 35 is preferably adjustable so that the charging current is of such an amount that the mains motor can be set running when the operator goes off shift and left running until the truck is required again for use, when the battery will be fully charged.

I claim:

1. In a vehicle the combination of a traction motor, a storage battery for operating the traction motor as a motor, a transmission from the traction motor to a road-wheel of the vehicle, a clutch in said transmission, a clutch-operating means, a series field winding on the traction motor, a shunt-field winding on the traction motor to enable it to act as a dynamo if suitably driven, a mains-motor disposed on the same side of the clutch as the traction motor adapted to drive said traction motor as a dynamo, a supply connection for the mains motor, switch means on the vehicle for closing said supply connection, and means interlocking the clutch-operating means and the switch means whereby when the switch means closes the supply connection the traction motor is necessarily disconnected by the clutch from the road wheel.

2. In a vehicle, the combination of a traction motor, a series winding for said motor for operation thereof as a motor, a shunt winding for said motor for operation thereof as a dynamo, a storage battery, a road wheel, transmission means including a clutch between said traction motor and said road wheel, a mains motor on the same side of the clutch as the traction motor adapted to drive said traction motor as a dynamo, variable resistance means in series arrangement with said traction motor armature, a battery-charging cut-out in series arrangement with said traction motor armature and operative in response to the voltage produced by said motor when operating as a dynamo, and switch means adapted to connect selectively said storage battery to the traction motor armature through said variable resistance means to operate said traction motor as a motor, and to connect said storage battery to the traction motor armature through said battery-charging cutout to operate said traction motor as a dynamo, said battery-charging cutout closing its circuit only when said motor shunt winding is energized and the voltage produced by said traction motor operating as a dynamo is greater than the voltage produced by said storage battery, and means interlocking said switch means and said clutch to ensure that when said shunt winding is energized the traction motor is necessarily disconnected from the road wheel, said interlocking means including a mechanical connection between said switch means and said clutch.

3. In a vehicle the combination of a traction motor, a storage battery for operating the traction motor as a motor, a transmission from the traction motor to a road-wheel of the vehicle, a clutch in said transmission, a clutch-operating means, a series field winding on the traction motor, a shunt field winding on the traction motor to enable it to act as a dynamo if suitably driven, a mains motor disposed on the same side of the clutch as the traction motor adapted to drive said traction motor as a dynamo, a supply connection to the mains motor, a switch on the vehicle for closing said supply connection to the mains motor, a switch in the shunt winding circuit, interlocking means between said switch in the shunt field winding circuit and said switch for closing said supply connection to ensure that said switch in the shunt field winding circuit is closed when the supply connection to the mains motor is closed and opened when it is opened, and means interlocking the clutch operating means and the supply connection switch whereby when the switch means closes the supply connection the traction motor is necessarily disconnected by the clutch from the road wheel.

4. In a vehicle the combination of a traction motor, a storage battery for operating the traction motor as a motor, a transmission from the traction motor a road-wheel of the vehicle, a clutch in said transmission, a clutch-operating means, a series field winding on the traction motor, a shunt field winding on the traction motor to enable it to act as a dynamo if suitably driven, a mains motor disposed on the same side of the clutch as the traction motor adapted to drive said traction motor as a dynamo, a supply connection to the mains motor, a switch on the vehicle for closing the supply connection to the mains motor, a switch in the shunt winding circuit, variable resistance means having a control handle in series with the traction motor armature, said control handle being constructed when moved to the off position to close a charging circuit, said charging circuit including a battery charging cut-out in series with said switch in the shunt field circuit of the traction motor, interlocking means between said switch in the shunt field winding circuit and said switch for closing said supply connection to ensure that said switch in the shunt field winding circuit is closed when the supply connection to the mains motor is closed and opened when it is opened, said means including a mechanical connection between said clutch operating means and said switch in the shunt field winding circuit, and further means interlocking the clutch operating means and the supply connection switch, said means including a mechanical connection between said clutch operating means and said supply connection switch whereby when the switch closes the supply connection the traction motor is necessarily disconnected by the clutch from the road wheel.

FRANK EDWARD BURGER.

REFERENCES CITED

The following references are of record in the file of this patent:

UNITED STATES PATENTS

| Number | Name | Date |
| --- | --- | --- |
| 676,965 | Sachs | June 25, 1901 |
| 2,170,546 | Candor et al. | Aug. 22, 1939 |

FOREIGN PATENTS

| Number | Country | Date |
| --- | --- | --- |
| 711,269 | France | Sept. 7, 1931 |

Certificate of Correction

January 30, 1951

Patent No. 2,539,987

FRANK EDWARD BURGER

It is hereby certified that error appears in the printed specification of the above numbered patent requiring correction as follows:

Column 4, line 29, after the word "motor" insert *to*;

and that the said Letters Patent should be read as corrected above, so that the same may conform to the record of the case in the Patent Office.

Signed and sealed this 27th day of March, A. D. 1951.

[SEAL]

THOMAS F. MURPHY,
*Assistant Commissioner of Patents.*